March 24, 1959 G. CORNELIUS 2,879,082
SELF LOCKING LATCH MEANS FOR PIPE LINE COUPLERS
Filed June 5, 1956
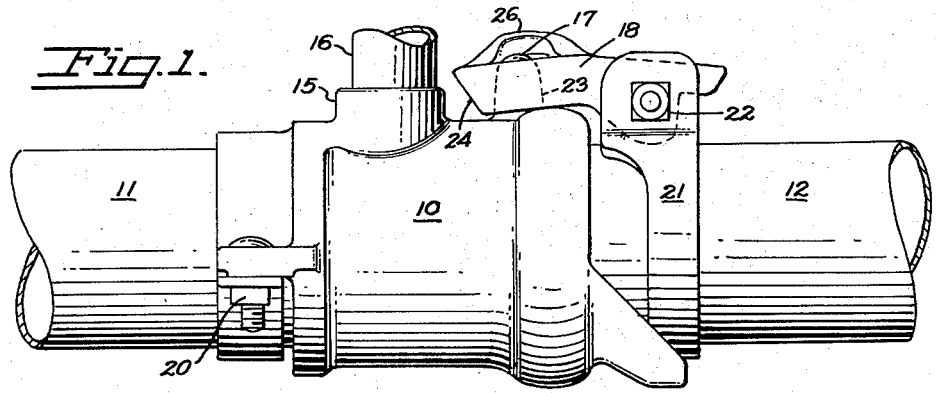
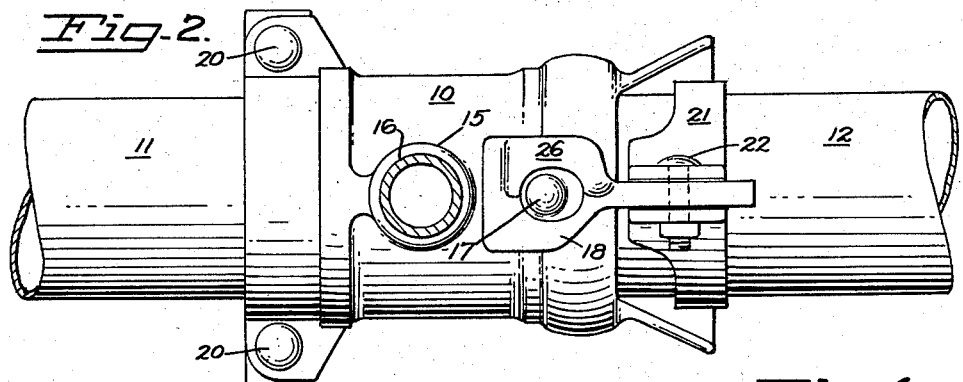
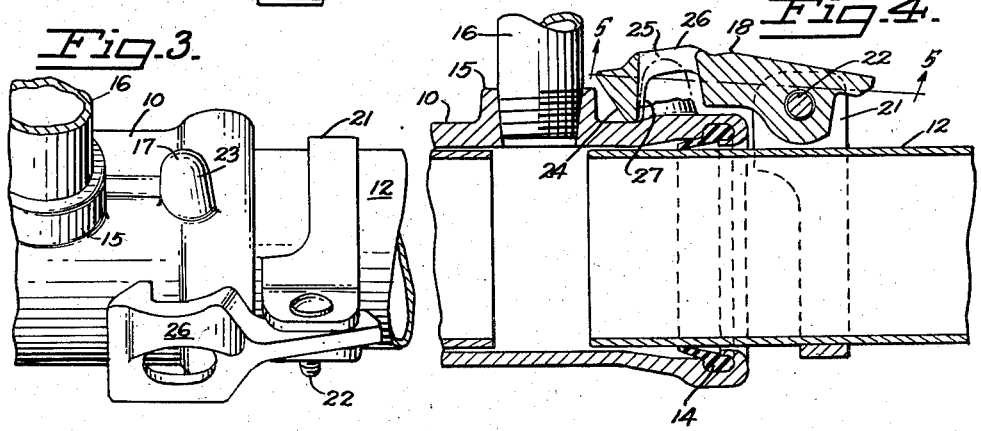
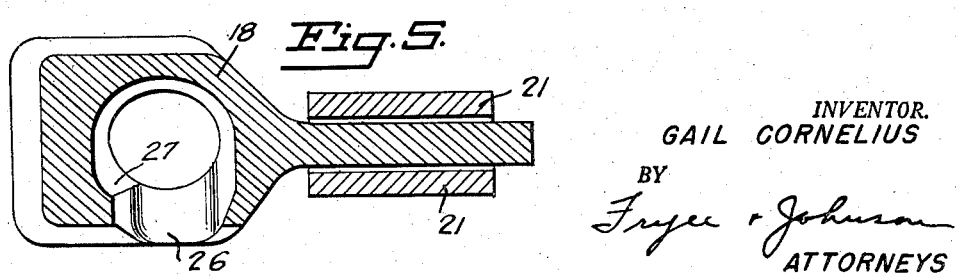
INVENTOR.
GAIL CORNELIUS
BY
ATTORNEYS

United States Patent Office 2,879,082
Patented Mar. 24, 1959

2,879,082

SELF LOCKING LATCH MEANS FOR PIPE LINE COUPLERS

Gail Cornelius, Portland, Oreg., assignor to R. M. Wade & Co., Portland, Oreg., a corporation of Oregon Application June 5, 1956, Serial No. 589,553

3 Claims. (Cl. 285—6)

This invention relates to pipe couplers of the kind employed in irrigating pipe lines and similar lines wherein a non-rigid fluid-type and quickly assembled coupling is employed.

The coupling of this invention is similar to that disclosed in my co-pending application entitled "Pipe Line With Self Locking Couplers," Serial No. 557,061, filed January 3, 1956 and now abandoned. As related in said application, pipe lines employed for sprinkler type irrigation are layed over the surface of the ground in lengths joined by couplings and frequently moved from place to place. These couplings are designed to permit the pipe sections to be quickly and easily attached and detached. They must be fluid tight when under pressure and are preferably sufficiently loose or flexible to permit the pipes to follow irregular terrain and gradual curves. This is accomplished through the use of a coupling slightly larger in diameter than the external diameter of the pipe and flexible gaskets in the coupling for making fluid tight joints when the pipe is inserted thereinto. Locking devices retain the pipe in the coupling and this invention is directed to such devices.

As also pointed out in my said co-pending application, the lengths of pipe which form a pipe line are coupled and uncoupled manually and preferably through some simple coupling and latching means that enables a worker to manipulate the end of a long length of pipe into its coupled position as he carries or holds the pipe at a point intermediate its ends. This saves time and labor otherwise required if it is necessary for the workman to walk to the end of the pipe for inserting it and latching it into place.

It is the object of the present invention to provide an improved pipe coupler and latch therefor in which the latch is automatically self-locking when the pipe is inserted into the coupling and in which the latch may be unlocked by rotation of the pipe in one direction only but in which this unlocking is impossible when the pipe contains fluid such as water under pressure. The purpose of the latter feature of the object stated above is to enable the pipe to be manipulated or rolled slightly so that all of the stand pipes which support sprinklers may be brought into vertical position without danger of causing unlatching at any of the couplers.

Further and more specific objects and advantages are made apparent in the following specification wherein reference is made to the accompanying drawings.

In the drawings:

Fig. 1 is a view in side elevation of a pipe coupler showing the ends of pipes inserted thereinto and including a locking device embodying the present invention, Fig. 2 is a plan view of the assembly illustrated in Fig. 1, Fig. 3 is a fragmentary plan view similar to Fig. 2 but illustrating the position of the latch when the pipe has been rotated in one direction to effect its release, and Fig. 4 is a central vertical longitudinal section of a portion of the coupler and the latch mechanism illustrated in Fig. 1.

Fig. 5 is a sectional view taken along line 5—5 of Fig. 4 looking in the direction of the arrows.

In Figs. 1 and 2 of the drawings, a pipe coupler is shown at 10 as a substantially tubular casting into both ends of which the ends of pipes 11 and 12 are inserted to provide for the continual flow of water through the sections of pipe which are employed to make up the pipe line. Gaskets are employed to form fluid tight seals between the coupling and the pipe ends where they extend into it. One such gasket is illustrated at 14 in Fig. 4 but it is of well-known design and its specific construction is not pertinent to an understanding of the present invention.

The coupling 10 is provided with a threaded outlet boss 15 which usually receives a stand pipe, a portion of which is shown at 16 for supporting and supplying water to a sprinkler head or the like not shown.

At one end, the coupling 10 is provided with a projection 17 which serves as a keeper for a latch member 18 which will presently be described in detail. At its opposite end, the coupling is provided with a split collar, the upper portion of which is formed integrally with the coupling and the lower portion of which is a separable part clamped to the upper portion and about the pipe by nut and bolt assemblies 20. Through this connection, the coupling is in effect permanently secured to one end of each length of pipe and it need not be removed therefrom when the lengths of pipe are disassembled to move the line from one location to another.

The opposite end of each length of pipe which is represented by the pipe 12 in the drawing carries a split collar 21 clamped to the pipe by a nut and bolt assembly 22 which also provides a pivotal support for the latch 18. This latch pivots vertically about its support 22 adjacent one end so that its opposite end which includes an opening may rise and fall with respect to the projection 17 on the coupler. The latched position is illustrated in Figs. 1, 2 and 4 with this opening embracing the projection 17 and preventing any substantial endwise movement of the pipe relative to the coupling. The outwardly facing surface of the projection 17 is inclined as illustrated at 23 and the forward or leading surface of the latch member is also inclined as illustrated at 24. Thus, when the pipe is thrust into the coupling, these inclined surfaces produce a cam action which raises the latch and permits it to fall into position in its latching relationship to the projection.

Considering the opening in the latch member as having two side walls and two end walls each of these walls with the exception of one is designed to prevent removal of the latch from its latching position by endwise or lateral movement with the exception of one which is the side wall best shown at 25 in Fig. 4. This side wall is cut away throughout the greater portion of its area to provide an opening which is large enough to pass over the projection 17 when the pipe 12 is lifted upwardly from its central portion and rotated in a counter-clockwise direction. An arch or bridge 26 connects the front and rear walls of the opening in the latch above the opening. As may best be seen in Fig. 4, where the projection 17 is illustrated in dotted lines for clarity, lifting of the pipe swings the latch upwardly at its pivoted end until the opening referred to is high enough to clear the top of the projection 17. In this position, the pipe may be twisted or rotated in a counter-clockwise direction and the latch is released by being moved to the position illustrated in Fig. 3 so that the pipe may be withdrawn. However, before raising and twisting of the pipe, the latch remains secure.

As also illustrated in Fig. 4, the opening in the side wall of the latch member does not extend all of the way to the front wall so that a shoulder or ledge 27 is present which also tends to prevent counter-clockwise rotation of the pipe. This shoulder is particularly important because in the operation of assembling a pipe line, the pipe ends are thrust into the couplings and the completed assembled line is relatively short with the rear wall of each opening in the latch bearing against the projection 17. However, when water under pressure is admitted to the line, the pressure lengthens or extends the line and each pipe end is thrust outwardly until the front wall of the latch opening engages the projection 17 as is best shown in Fig. 4. In this position, the shoulder 27 also serves to prevent counter-clockwise rotation. Many times it is observed when the water under pressure starts to flow through the sprinklers that some of the stand pipes are, due to twisting of the pipe line, not in a true vertical position. It is customary to correct this by grasping a vertical stand pipe and swinging it laterally of the longitudinal axis of the pipe line, thus relieving the stresses which cause the twisting until all stand pipes are vertical. With the present construction, this practice may be safely followed without danger of releasing any of the latches. The latches are actually not in a releasable position until the pipe has been raised and pushed forwardly a slight distance so that the opening in a latch registers with the projection 17 and only then will the counter-clockwise twisting action effect release of the latch.

I claim:

1. A pipe coupling including a coupling member and a pipe having an end portion received within one of the end portions of said coupling member, an outwardly extending projection formed on the outer surface of said coupling member adjacent said one end portion, a collar mounted on said pipe end portion and being adapted to engage said one end portion of the coupling member, a latch pivotally supported by said collar and having an upper and a lower surface, the outer end of said latch including an inclined cam surface, the outer portion of said projection disposed adjacent said one end portion of the coupling member being provided with a complementary cam surface adapted to engage said first cam surface and cam said latch member upwardly when the end of the pipe is inserted within said one end portion of the coupling member, said latch having an opening formed therethrough adjacent the outer end thereof and extending from the upper to the lower surface thereof, said latch having an outer and an inner end wall and two side walls, said outer end wall being adapted to engage the inner portion of said projection remote from said one end portion of the coupling member, said end wall and said inner portion of said projection having complementary sloping surfaces preventing separation of said pipe and said coupling member under load, one of said side walls including a substantially inverted U-shaped cut-away portion opening onto said lower surface and in communication with said opening, said U-shaped cut-away portion being large enough to pass over said projection when the pipe is lifted upwardly and rotated with respect to said coupling member, a shoulder portion extending from said outer end wall into said opening and adapted to engage said projection and prevent relative rotation between said pipe and said coupling member when the apparatus is subjected to fluid pressure, whereby said projection is normally prevented from passing through said cut-away portion in the side wall of the latch but is permitted to pass therethrough only by telescoping said pipe into said coupling member and tilting and rotating said pipe with respect to said coupling member.

2. Apparatus as defined in claim 1, wherein said projection has an outer surface of substantially conical configuration.

3. Apparatus as defined in claim 1, wherein said inverted U-shaped cut-away portion is offset inwardly of said outer wall to define said shoulder portion.

References Cited in the file of this patent

UNITED STATES PATENTS

| | | |
|---|---|---|
| 2,327,572 | Wallis | Aug. 24, 1943 |
| 2,355,407 | Wyss | Aug. 8, 1944 |
| 2,470,539 | Wyss | May 17, 1949 |
| 2,572,644 | Moulton | Oct. 31, 1950 |
| 2,677,558 | Cornelius | May 4, 1954 |
| 2,677,559 | Cameron | May 4, 1954 |